(12) United States Patent
Blaschke

(10) Patent No.: US 6,260,302 B1
(45) Date of Patent: Jul. 17, 2001

(54) RETRACTABLE FISHING NET

(76) Inventor: Royce E. Blaschke, 704 Edinburgh St., Victoria, TX (US) 77904

( * ) Notice: Subject to any disclaimer, the term of this patent is extended or adjusted under 35 U.S.C. 154(b) by 0 days.

(21) Appl. No.: 09/354,208

(22) Filed: Jul. 15, 1999

(51) Int. Cl.⁷ .................................................. A01K 77/00
(52) U.S. Cl. ................................................................ 43/12
(58) Field of Search ...................................... 43/7, 11, 12

(56) References Cited

U.S. PATENT DOCUMENTS

| 440,568 | 11/1890 | Hebard . | |
|---|---|---|---|
| 2,115,082 | * 4/1938 | Phillips | 43/12 |
| 2,620,585 | * 12/1952 | Delcey | 43/12 |
| 2,653,404 | * 9/1953 | Phaneuf | 43/12 |
| 2,727,328 | 12/1955 | Dunton . | |
| 2,738,608 | 3/1956 | Buzzini . | |
| 2,800,737 | * 7/1957 | Crossan | 43/12 |
| 3,167,878 | 2/1965 | Daffron . | |
| 3,512,291 | * 5/1970 | Proulx | 43/12 |
| 3,715,829 | 2/1973 | Hamilton . | |
| 4,032,650 | 6/1977 | Popeil . | |
| 4,446,646 | 5/1984 | Veld . | |
| 4,514,925 | 5/1985 | Rockwood . | |
| 4,706,404 | 11/1987 | Kun . | |
| 4,815,227 | 3/1989 | Flanders, Sr. . | |
| 5,157,854 | * 10/1992 | Rumsey | 43/12 |
| 5,581,929 | * 12/1996 | Molloy | 43/12 |
| 5,941,011 | * 8/1999 | Baker | 43/12 |

* cited by examiner

Primary Examiner—Kurt Rowan
(74) Attorney, Agent, or Firm—Jackson Walker LLP

(57) ABSTRACT

A fishing device to assist is landing a fish which device comprises a net frame have a multiplicity of hinged members. A net engages the net frame, which frame is retractable into a hollow handle. A drive shaft is used to drive the hinged members of the net frame into and out of the handle, which drive shaft is comprised of a linear member dimensioned to fit within the hollow handle.

5 Claims, 5 Drawing Sheets

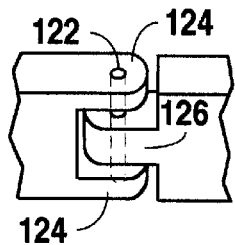
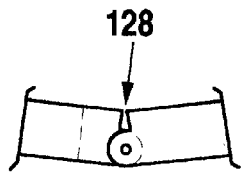
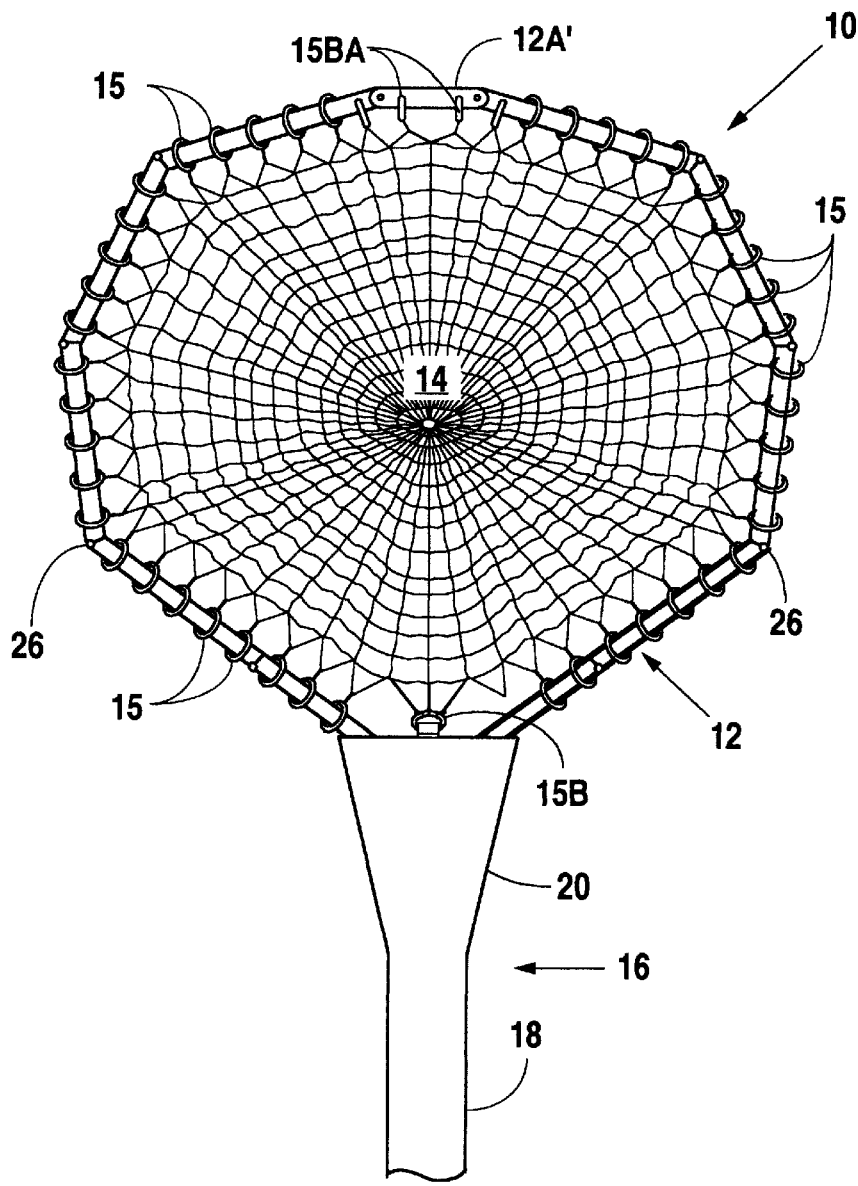

RETRACTABLE FISHING NET

BACKGROUND OF THE INVENTION

1. Field of the Invention

Applicant's invention relates to a retractable fishing net device; more specifically, a retractable fish net with a handle enclosed, pivotable drive shaft.

2. Background Information

Fishing is a popular sport. It usually requires the use of a net to help land the fish. However, nets are bulky items, typically having a long handle and head, this being necessary to reach fish from over the side of a boat or from a dock. Because fishing nets are long and cumbersome, they are sometimes left behind, often to the detriment of the fisherman attempting to land a fish.

Prior art fishing nets have addressed this problem in providing for a retractable fish net head. More specifically, prior art fish nets have provided fish net heads or net frames which are made out of multiple members hinged together and foldable into a hollow handle.

Applicant, however, provides a more efficient means than has heretofore been available of retracting and extending a fishing net having a collapsible head frame into and out of a hollow handle through the use of a unique elongated, handle-receiving drive shaft.

OBJECTS OF THE INVENTION

It is the object of Applicant's present invention to provide for a fishing net device that is easy to store and to transport. It is a further object of Applicant's present invention to provide for a retractable fishing net device that is simple to manufacture and use. It is yet another object of Applicant's present invention to provide for a fishing net device which is durable and functional. Finally, it is yet another object of Applicant's present invention to provide for a fishing net device with a collapsible net frame which is retractable into the handle, which device is easy to transport and store, simple to manufacture and use, and durable and functional.

SUMMARY OF THE INVENTION

Applicant achieves these objects by providing a fishing device to assist in landing a fish which device comprises a net frame having a multiplicity of hinged members. A net engages the net frame, which frame is retractable into a hollow handle. A drive shaft is used to drive the hinged members of the net frame into and out of the handle, which drive shaft is comprised of a linear member dimensioned to fit within the hollow handle.

Applicant provides alternate preferred embodiments of the present invention, namely, embodiments which provide electrical power to move the net frame from an extended use position to a retracted position within the hollow handle. Yet another alternate preferred embodiment of Applicant's present invention provides a hand crank to drive the net frame between the extended and retracted position.

BRIEF DESCRIPTION OF THE DRAWINGS

FIG. 5A is a side elevational view of the manner in which the frame members engage one another.

FIG. 5B is a top elevational view of the manner in which the hinged members are joined, one to the other.

FIG. 5C is a bottom elevational view of the manner in which the rings engage the net to the folding frame head.

DETAILED DESCRIPTION OF THE PREFERRED EMBODIMENT

Figure 1:
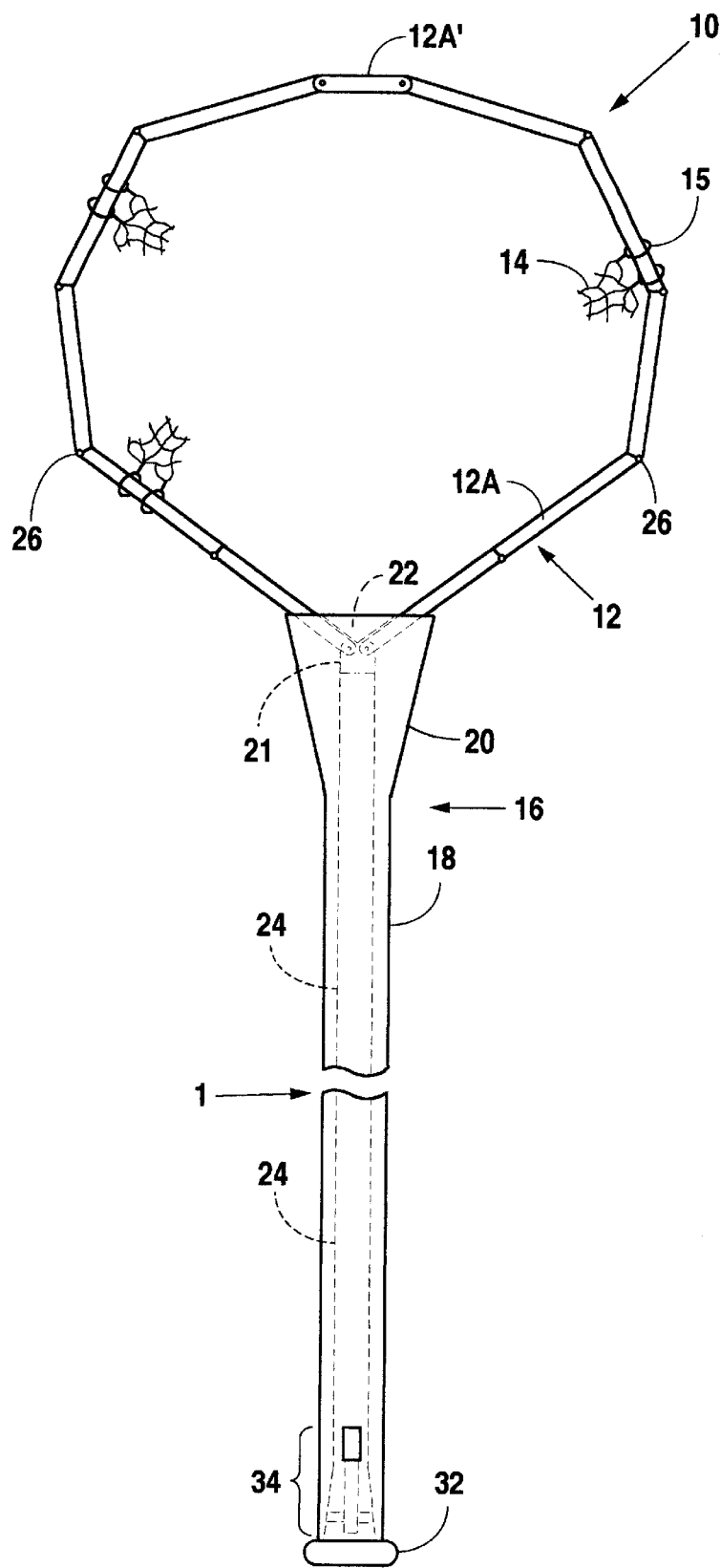
FIG. 1 is a top elevational view of Applicant's present invention with the head frame loop in an extended position and the drive shaft within the handle tube.

With reference to FIG. 1 it is seen that Applicant provides a retractable fishing net tool 10 which includes a hinged loop net head frame 12 (hinged loop) comprised of a multiplicity of rigid hingedly attached frame members 12A which hinged loop has attached thereto a net 14 by means of a multiplicity of rings 15, most of which rings slideably fit over the hinged loop.

FIG. 1 also illustrates the manner in which Applicant's fishing net tool 10 provides a hollow handle tube 16, which may be made of metal, plastic, fiberglass, or other suitable material, and may be, in cross section, square, rectangular, round, or any other suitable shape. More specifically, it is noted that Applicant's handle 16 includes an outer surface 18 and a handle head 20, the handle head at the end from which hinged loop 12 is retracted and extended in the operation of the device as set forth in more detail below.

Figure 2:
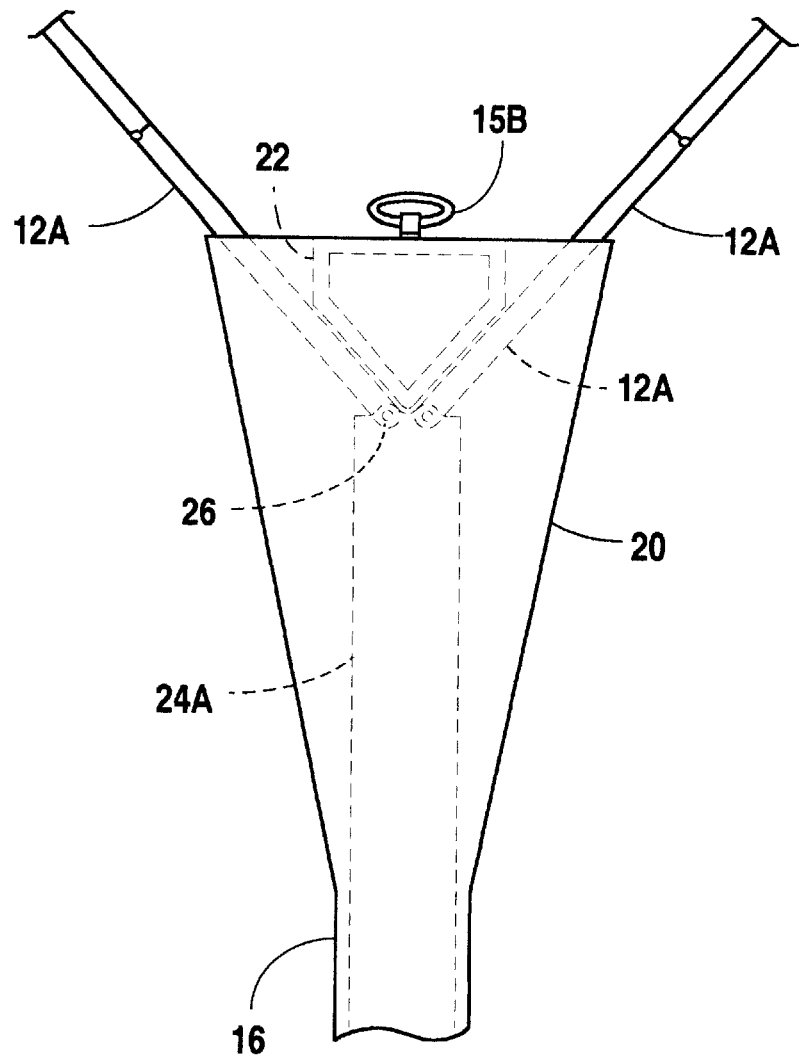
FIG. 2 is a detailed view of one end of the drive shaft and the manner in which it connects to the frame of the head of the invention and, further, illustrating how the drive shaft/frame unit engages the stop block.
Figure 3:
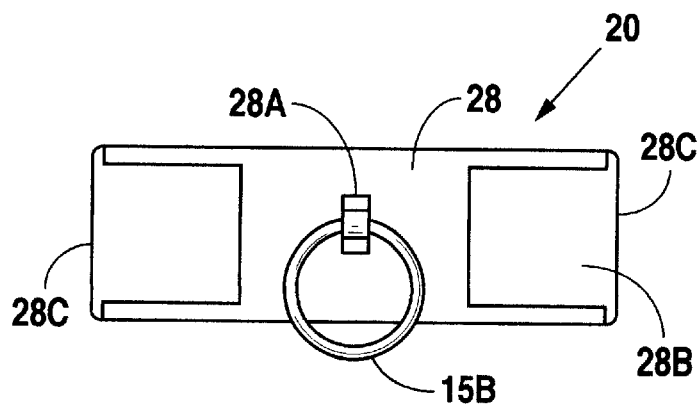
FIG. 3 is a front elevational view of the handle head of Applicant's present invention.
Figure 4:
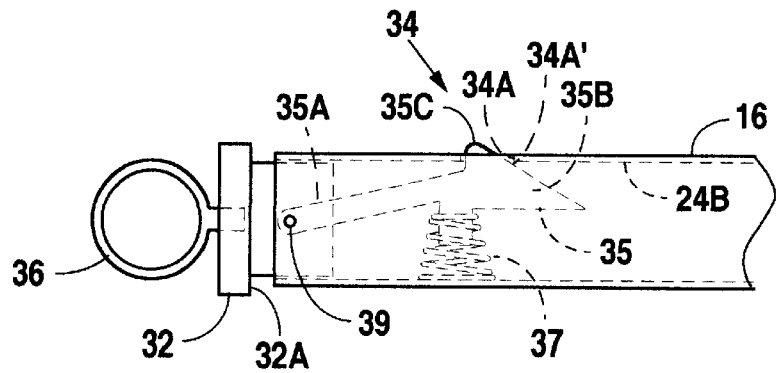
FIG. 4 is a side elevational view of the removed end of the handle of Applicant's present invention illustrating the drive shaft and drive shaft locking means therein.

Turning to FIGS. 1 through 5C it is seen that Applicant's handle 16 defines a substantially hollow interior into which a drive shaft 24 may reside, which drive shaft has a near end 24A which near end includes hinge pins 26 for hingeably attaching the hinged loop to the drive shaft and, with reference to FIG. 4, the drive shaft is seen to have a far or removed end 24B. The drive shaft is dimensioned to fit within the handle when the hinged loop is in an extended (use) position, as illustrated in FIG. 1.

FIG. 2 illustrates the manner in which, with the drive shaft urging hinged loop 12 into an extended or use position, a stop block 22 is provided to engage the handle head and to urge the two hinged members that are attached to the near end 24A of the drive shaft into a spread or open position. Namely, it is seen that the stop block includes walls defining a "V" shape which "V" shape spreads the two hinged members 12A adjacent the near edge of drive shaft into an open position.

Note that the side walls of handle head 20 are tapered. This is illustrated by dimension A in FIG. 2. The distance A should be slightly longer than the longest hinged member for the hinged loop to properly retract within the handle.

FIG. 3 illustrates a view of the handle head 20 illustrating handle head front plate 28 with walls defining cut-outs 28B and also illustrating side walls of handle head 28C to provide an appreciation of the manner in which the handle head 20, in conjunction with stop block 22, will engage the first two members of the hinged loop when the drive shaft is urged against the stop block 22 and the hinged loop is in a fully extended or use position. More specifically, walls defining cut-outs 28B help support and guide the hinged members of hinged loop 12.

FIG. 1 also illustrates the manner in which the drive shaft, when in a fully extended position within handle 16, may be locked in such a position using drive shaft locking means 34. FIG. 1 also illustrates the manner in which drive shaft and plug 32 may be dimensioned to fit within handle 16 so as to position and maintain the drive shaft within the handle in the extended position illustrated in FIG. 1.

Further details of Applicant's drive shaft locking means, wherein the drive shaft is locked in a fully extended position (meaning the hinged loop is extended from the handle and the drive shaft is within the handle) may be appreciated with reference to FIG. 4. More specifically, FIG. 4 illustrates that Applicant's drive shaft locking means includes pivoting member 35 having a pivoting end 35A in which a pin engages the pivoting member with drive shaft end plug 32. Drive shaft end plug is fixedly located in the removed end of the drive shaft and includes walls 32A. Pivoting member 35 also has a removed end 35B which is dimensioned with walls including a shoulder 35C, which shoulder will extend through cut-outs 34A and 34A' in both the removed end of handle 16 as well as in the removed end of the hollow drive shaft, so as to lock the drive shaft in the extended position within the handle. More specifically, it can be seen with reference to FIG. 4 that a spring 37 is designed to normally urge removed end 35B in the position illustrated in FIG. 4 with shoulder 35C through the cut-outs. However, it may be appreciated that if the shoulder illustrated in removed end 35B, which is shown extending through the two cut-outs 34A and 34A', is depressed, then the drive shaft may be retracted from within handle 16 of the handle by pulling end plug ring 36 to the left as illustrated in FIG. 4. The retraction of the drive shaft from handle 16 will cause frame members 12A to collapse and retract within outer cover 18 to the position illustrated in FIG. 6.

More details of hinged loop net head frame 12 (hinged loop) may be appreciated with reference to FIGS. 5A through 5C. First, it is seen with reference to FIG. 5A, that individual hinged members may be engaged by hinges 120 between adjacent members 12A which hinge 120 includes a pin 122 to engage a pair of extending arms 124 from one member to a tongue 126 of the adjacent member. Further, it can be seen with references to FIG. 5B that canted opposing end walls 128A of adjacent hinged members, when cut at an angle, may define the shape of the ring (see also FIG. 1). More particularly, canted adjacent end walls of any pair of attached, articulating, adjacent hinged members 12A will be located on the in board side of the plane head, with the hinge located on the outboard side thereof to allow the frame head to fold and retract within handle 18.

Turning back to FIG. 1, details of the angles of canted end walls of adjacent hinged members may be appreciated. For example, working outward from the near end of the drive shaft, it is seen that the first pair of hinged members have canted end walls that are perpendicular to the longitudinal axis of the adjacent members and, therefore, the adjacent members are straight, defining 180° angle. Other adjacent pairs have interim angles of less than 180° with member 12A' having an angle of about 120° with adjacent members when a member ring 11 is used as illustrated.

FIG. 5C illustrates how net 14 is hung on rings 15, most of which will slide over the retracting frame members as hinged loop 12 is being retracted within handle 16 by retraction of the drive shaft 24. However, FIG. 5C also illustrates three fixed (non-sliding) rings 15A (two) and 15B (one). First, a pair of fixed rings 15A are located on the hinged member 12A' which is opposite handle head 20 (when hinged loop 12 is in the extended position). These rings are non-slideably mounted to this particular hinged member to allow the net to be stretched out when the drive shaft is extended into handle and the net is being moved to an extended position. On the other hand, FIG. 5C also illustrates another fixed ring 15B located on eyelet 28A, which will keep the net from pulling too far forward as the net reaches its extended (use) position.

Figure 6:
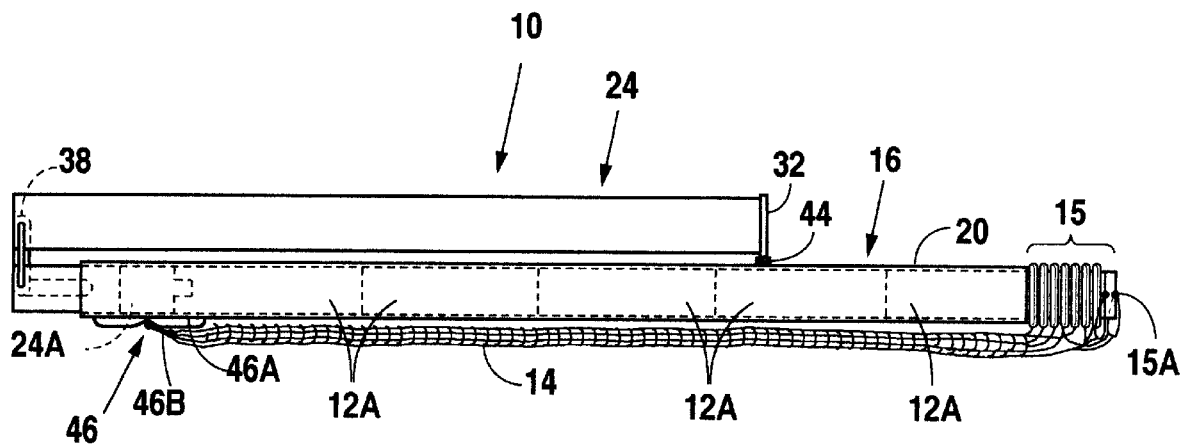
FIG. 6 is a side elevational view of Applicant's fishing device with the head frame loop in a retracted position and the drive shaft folded back against the handle tube.

FIG. 6 illustrates Applicant's fishing device with drive shaft 24 retracted from handle 16 and folded over through the use of Applicant's unique slip joint 38 to lay longitudinal against the outer surface of the handle 16. It can be seen in FIG. 6 that the drive shaft is retracted from the handle and the collapsible frame is stored within the handle. Slip joint 38 allows articulation between near end 24A of the drive shaft (which remains in the removed end of the handle) and the remainder of the drive shaft.

Figures 6A, 6B:
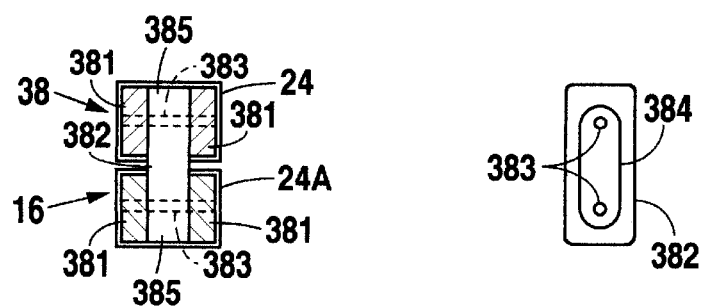

Further, with reference to FIGS. 6, 6A, and 6B, it is seen that Applicant's slip joint 38 includes paired stubs 381, typically metal, which are rectangular and inserted into the typically hollow drive shaft at the points indicated, as well as a slotted joinder rod 382 which connects the two portions of the drive shaft where it pivots. Pins 383 engage longitudinal slot 384 near the ends of the rod. It can been seen that pins 383 trend transversely from one stub 381 to the other with a pin in each of the joined portions of the drive shaft. This slotted rod 382 rides in gap 385 between the paired stubs 381 and allows the rotation of the drive shaft from a straight (see FIG. 1) to a turned position (see FIG. 6).

Thus, it is seen that Applicant's drive shaft may be pivoted to fold over onto the outside of the handle when the frame is retracted into the handle. This makes a nice compact unit, as may be appreciated with reference to FIG. 6. Moreover, it can been seen with reference to FIG. 6 that by placing a pair of magnets 44, one of the outer surface of the handle near the front, and the other on the removed end of the drive shaft, the drive shaft will stay in its folded position.

A second unique feature illustrated in FIG. 6 is the hook-and-eyelet combination 46 that is seen near the removed end of the handle. A hooked member 46A is attached to the outer surface of the handle near the removed end thereof. At or near the apex of the net is an eyelet 46B, typically metal, which combination allows the user to stretch the net as seen in FIG. 6, and hook the eyelet over the hooked member to provide a convenient package for transportation and storage, with the net stretched longitudinally adjacent the longitudinal axis of the both the drive shaft and the handle.

Figure 7:
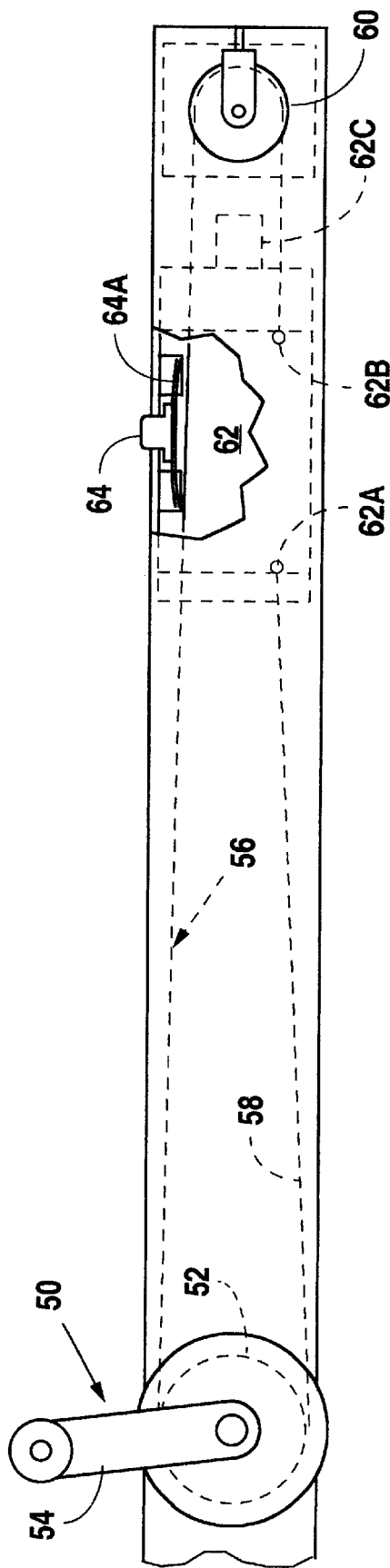
FIG. 7 is an alternate preferred embodiment of Applicant's present invention feature a hand crank for retracting and extending the foldable members of the frame and the head.

FIG. 7 illustrates an alternate preferred embodiment of Applicant's present invention featuring a handle mounted hand crank mechanism 50 on the end of the handle. The handle is hollow and the hand crank 50 includes a rotatable barrel 52 on which a handle 54 is mounted, which handle when moved causes the barrel to rotate. Attached to the barrel is an extend cable 56 and a retract cable 58. When the drum is rotated in the first direction, retract cable 58 will wind up on the barrel and extend cable will unwind from the barrel. Extend cable 56 extends around a pulley 60 mounted near the front end of the hollow handle. The ends of both extend and retract cables are attached to slider 62 at 62A and 62B; the slider also has a detent button 64 on the surface thereof. It is seen that detent button 64 includes a leaf spring 64A engaging the slider which leaf spring urges the detent button against the underside of the handle such that when the button encounters a cut-out, it will be urged through the cut-out and fix the location of the slider (in either the retracted or extended position). Detent button 64 can engage handle cut-outs, one at the near end and one at the far end of handle, which will allow the slider to be positioned in a retracted position (when near the far end of the handle or the left end of the handle as viewed in FIG. 7) or an extended position with the slider in the approximate position illustrated in FIG. 7, with the net extended from the handle. It is seen that slider 62 includes projecting end 62C, which is dimensioned for receipt of the pivoting members of the linked loop thereon.

Figure 8:
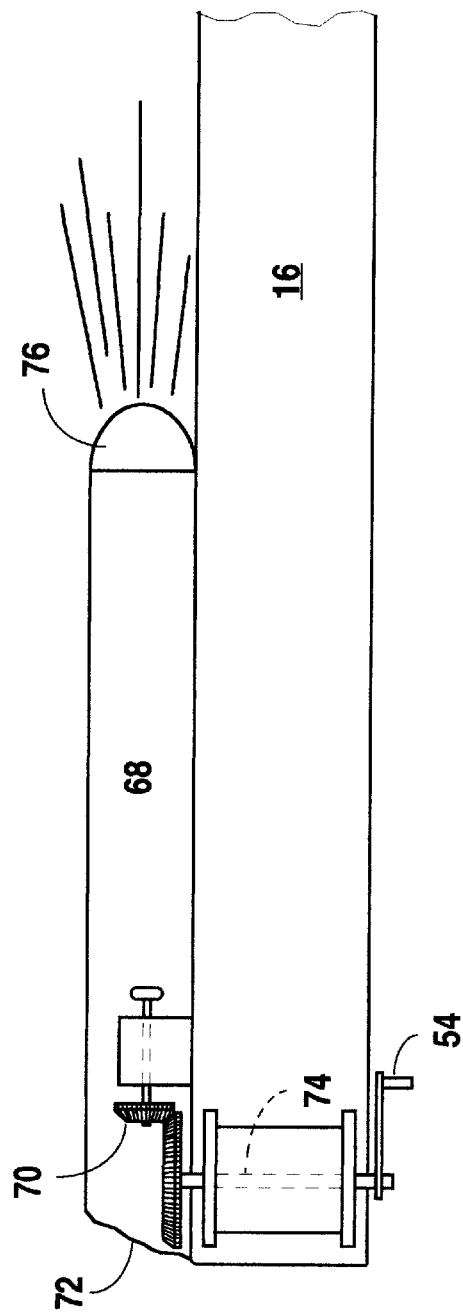
FIG. 8 is yet another alternate preferred embodiment of Applicant's present invention which features an electric motor for electrically retracted and extending the net head frame from the handle tube.

FIG. 8 illustrates details of another alternate preferred embodiment which uses an electric motor 68 to drive a spur gear 70, which gear in turn drives a second gear 72, which is mounted to an axle 74, which in turn is rigidly attached to the drum. The electric motor is reversible and so the drum may draw the slider as illustrated in FIG. 7 between a retracted and an extended position. It is further seen that the electric motor is attached to the handle 16 and may have attached thereto a light 76 which would help the fisherman see at night. The electric motor may be battery powered. (A hand held, rechargeable, electric screw driver made by Popular Mechanics® was used on the prototype.)

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A fishing device to assist in landing a fish, the device comprising:

a net frame comprising a multiplicity of hinged members;

a net including means to engage the net to the frame;

a hollow handle having length sufficient to enclose the net frame and having walls thereon, the hollow handle with a handle head at a front end thereof, the handle head having a stop block for engaging the net frame between a pair of the multiplicity of the hinged members thereof;

a drive shaft dimensioned to and capable of slideably fitting within said hollow handle and having a first end to hingedly engage at least some of said members of said multiplicity of hinged members, the drive shaft having a removed end, the removed end including a plug with a lock means for engaging said hollow handle to lock the drive shaft with respect to the handle such that when the drive shaft is enclosed within the walls of the hollow handle and the net is in an extended position, the plug seats against a rear perimeter of said walls of the hollow handle and the lock means secures the drive shaft within said handle with the first end against the stop block wherein the removed end of the drive shaft includes a slip joint for allowing the drive shaft to pivot and fold against the handle when the drive shaft is retracted from said hollow handle, but allowing the drive shaft to be inserted into the hollow handle when the net is ready for use.

2. The fishing device of claim 1 further including means to hold the folded drive shaft against the outside surface of the handle.

3. The fishing device of claim 1 further including means to attach the net to the handle when the drive shaft is retracted from the handle.

4. The fishing device of claim 1 further including means to support and guide said hinged members when the net frame is being moved between an extended (use) position and a retracted position stored within the handle of the device.

5. The fishing device of claim 1 further including means engageable with the drive shaft to assist in maintaining the net frame in an extended (use) position.

* * * * *